US012371534B2

(12) United States Patent
Sugie et al.

(10) Patent No.: US 12,371,534 B2
(45) Date of Patent: Jul. 29, 2025

(54) PHOTOCURABLE SILICONE COMPOSITION AND CURED PRODUCT THEREOF

(71) Applicants: DOW TORAY CO., LTD., Tokyo (JP); DOW SILICONES CORPORATION, Midland, MI (US)

(72) Inventors: Atsushi Sugie, Ichihara (JP); Makoto Yoshitake, Ichihara (JP); Juyoung Yook, Chungcheongbuk-do (KR)

(73) Assignees: DOW TORAY CO., LTD., Tokyo (JP); DOW SILICONES CORPORATION, Midland, MI (US)

( * ) Notice: Subject to any disclaimer, the term of this patent is extended or adjusted under 35 U.S.C. 154(b) by 618 days.

(21) Appl. No.: 17/778,047

(22) PCT Filed: Nov. 19, 2020

(86) PCT No.: PCT/US2020/061165
§ 371 (c)(1),
(2) Date: May 19, 2022

(87) PCT Pub. No.: WO2021/102073
PCT Pub. Date: May 27, 2021

(65) Prior Publication Data
US 2022/0403114 A1  Dec. 22, 2022

Related U.S. Application Data

(60) Provisional application No. 62/939,640, filed on Nov. 24, 2019.

(51) Int. Cl.
| | | |
|---|---|---|
| C08G 77/20 | (2006.01) | |
| C08F 220/30 | (2006.01) | |
| C08F 222/10 | (2006.01) | |
| C08G 77/00 | (2006.01) | |
| C08J 3/28 | (2006.01) | |
| C08K 5/13 | (2006.01) | |
| C08K 5/32 | (2006.01) | |
| C08K 5/37 | (2006.01) | |
| C08K 5/5397 | (2006.01) | |

(52) U.S. Cl.
CPC .......... C08G 77/20 (2013.01); C08F 220/306 (2020.02); C08F 222/102 (2020.02); C08G 77/80 (2013.01); C08J 3/28 (2013.01); C08K 5/13 (2013.01); C08K 5/32 (2013.01); C08K 5/37 (2013.01); C08K 5/5397 (2013.01); C08J 2383/07 (2013.01); C08K 2201/014 (2013.01)

(58) Field of Classification Search
None
See application file for complete search history.

(56) References Cited

U.S. PATENT DOCUMENTS

| | | |
|---|---|---|
| 3,661,744 A | 5/1972 | Kehr et al. |
| 4,808,638 A | 2/1989 | Steinkraus et al. |
| 4,946,874 A | 8/1990 | Lee et al. |
| 5,158,988 A | 10/1992 | Kurita et al. |
| 5,795,650 A | 8/1998 | Watanabe et al. |
| 6,800,366 B2 | 10/2004 | Chang et al. |
| 8,293,810 B2 | 10/2012 | Ito et al. |
| 8,716,362 B2 | 5/2014 | Ono et al. |
| 8,865,787 B2 | 10/2014 | Sakamoto |
| 10,385,210 B2 * | 8/2019 | Dutta ..................... C08G 77/80 |
| 10,829,639 B2 * | 11/2020 | Ogawa .................... C08K 5/14 |
| 2006/0007519 A1 | 1/2006 | Kanouni et al. |
| 2009/0296033 A1 | 12/2009 | Shinya et al. |
| 2012/0202911 A1 | 8/2012 | Mitsuoka et al. |
| 2013/0149455 A1 | 6/2013 | Ooike et al. |
| 2013/0271828 A1 | 10/2013 | Everaerts et al. |
| 2016/0032102 A1 | 2/2016 | Srikanth et al. |
| 2017/0298188 A1 | 10/2017 | Dutta et al. |
| 2018/0009953 A1 | 1/2018 | Lu et al. |
| 2018/0327594 A1 * | 11/2018 | Ogawa .................... C08K 5/14 |
| 2018/0362764 A1 | 12/2018 | Dutta et al. |

(Continued)

FOREIGN PATENT DOCUMENTS

| | | |
|---|---|---|
| CN | 105492539 A | 4/2016 |
| CN | 109923175 A | 6/2019 |

(Continued)

OTHER PUBLICATIONS

International Search Report for PCT/US2020/061165 dated Mar. 16, 2021, 5 pages.
International Search Report for PCT/US2020/061167 dated Mar. 16, 2021, 4 pages.
Machine assisted English translation of KR101695316B1 obtained from https://patents.google.com/patent on Nov. 7, 2022, 12 pages.
Machine assisted English translation of JPH07134538A obtained from https://patents.google.com/patent on Nov. 7, 2022, 5 pages.

(Continued)

*Primary Examiner* — Sanza L. McClendon
(74) *Attorney, Agent, or Firm* — Warner Norcross + Judd LLP

(57) ABSTRACT

A photocurable silicone composition is disclosed. A cured product of the composition is also disclosed. The photocurable silicone composition comprises: (A) an organopolysiloxane having at least one aryl group with 6 to 12 carbons and at least one alkenyl group with 2 to 12 carbons in a molecule; (B) an organic compound having at least two ether bonds and at least one aliphatic carbon-carbon double bond in a molecule; (C) a thiol group-containing organic compound comprising; ($C_1$) an organic compound having two thiol groups in a molecule, and ($C_2$) an organic compound having at least three thiol groups in a molecule; and (D) a photoradical initiator. The composition generally suppresses crack and delamination of a cured product laminated between two substrates after thermal aging.

13 Claims, No Drawings

(56) References Cited

U.S. PATENT DOCUMENTS

| | | | |
|---|---|---|---|
| 2019/0112430 A1 | 4/2019 | Yook et al. | |
| 2020/0032111 A1 | 1/2020 | Ogawa et al. | |

FOREIGN PATENT DOCUMENTS

| | | | |
|---|---|---|---|
| EP | 0437247 | A2 | 7/1991 |
| EP | 0456346 | A2 | 11/1991 |
| JP | H02233764 | A | 9/1990 |
| JP | H02245060 | A | 9/1990 |
| JP | H0364389 | A | 3/1991 |
| JP | H05156163 | A | 6/1993 |
| JP | H07134538 | A | 5/1995 |
| JP | 2008282000 | A | 11/2008 |
| JP | 2012103705 | A | 5/2012 |
| JP | 2013253179 | A | 12/2013 |
| JP | 2016146468 | A | 8/2016 |
| JP | 2019507813 | A | 3/2019 |
| KR | 101695316 | B1 | 1/2017 |
| WO | 2015030224 | A1 | 3/2015 |
| WO | 2015148318 | A1 | 10/2015 |
| WO | 2017082180 | A1 | 5/2017 |
| WO | 2017155919 | A1 | 9/2017 |
| WO | 2019099347 | A1 | 5/2019 |

OTHER PUBLICATIONS

Machine assisted English translation of JPH02245060A obtained from https://worldwide.espacenet.com/patent on Nov. 7, 2022, 5 pages.

Machine assisted English translation of JPH0364389A obtained from https://worldwide.espacenet.com/patent on Nov. 7, 2022, 4 pages.

Machine assisted English translation of JP2013253179A obtained from https://patents.google.com/patent on Nov. 7, 2022, 12 pages.

Machine assisted English translation of JPH02233764A obtained from https://worldwide.espacenet.com/patent on Nov. 7, 2022, 5 pages.

Machine assisted English translation of JP2012103705A obtained from https://worldwide.espacenet.com/patent on Nov. 28, 2023, 22 pages.

Machine assisted English translation of JP2016146468A obtained from https://worldwide.espacenet.com/patent on Jan. 12, 2023, 17 pages.

* cited by examiner

PHOTOCURABLE SILICONE COMPOSITION AND CURED PRODUCT THEREOF

CROSS-REFERENCE TO RELATED APPLICATIONS

This application is the U.S. National Stage of International Application No. PCT/US2020/061165 filed on 19 Nov. 2020, which claims priority to and all advantages of U.S. Provisional Patent Application No. 62/939,640 filed on 24 Nov. 2019, the content of which is incorporated herein by reference.

FIELD OF THE INVENTION

The present invention relates to a photocurable silicone composition and a cured product thereof.

DESCRIPTION OF THE RELATED ART

Patent Document 1 proposes a photocurable silicone composition comprising: an organopolysiloxane having at least one aryl group with 6 to 12 carbons and at least one alkenyl group with 2 to 12 carbons in a molecule, an organic compound having at least two ether bonds and at least one aliphatic carbon-carbon double bond in a molecule, a compound having at least two thiol groups in a molecule, a photoradical initiator having a phosphorus atom, and a hindered phenol compound. The photocurable silicone composition cures by irradiation with an active energy ray to form a cured product that suppresses reduction in transmittance due to coloring and haze even when being left in high temperature/high humidity conditions.

However, such a photocurable silicone composition has a problem that, after thermal aging, a cured product thereof cracks or delaminates from a substrate which the composition contacts during curing.

CITATION LIST/PATENT LITERATURE

Patent Document 1: International Publication No. WO 2017/155919 A1

BRIEF SUMMARY OF INVENTION

Technical Problem

An object of the present invention is to provide a photocurable silicone composition suppressing crack and delamination of a cured product in an optical device or image display.

Solution to Problem

The photocurable silicone composition of the present invention comprises:
(A) 100 parts by mass of an organopolysiloxane having at least one aryl group with 6 to 12 carbons and at least one alkenyl group with 2 to 12 carbons in a molecule;
(B) from 1 to 50 part(s) by mass of an organic compound having at least two ether bonds and at least one aliphatic carbon-carbon double bond in a molecule;
(C) from 4 to 40 parts by mass of a thiol group-containing organic compound comprising;
  ($C_1$) an organic compound having two thiol groups in a molecule, and
  ($C_2$) an organic compound having at least three thiol groups in a molecule; and
(D) from 0.05 to 2 parts by mass of a photoradical initiator.

In various embodiments, component (A) is an organopolysiloxane represented by the average composition formula:

wherein, $R^1$ is an alkenyl group having from 2 to 12 carbons, $R^2$ is an alkyl group having from 1 to 12 carbons, an aryl group having from 6 to 12 carbons, or an aralkyl group having from 7 to 12 carbons; provided that, at least 30 mol % of $R^2$ are the aryl groups or the aralkyl groups; and "a" and "b" are positive numbers satisfying: $1 \leq a+b \leq 2.5$ and $0.001 \leq a/(a+b) \leq 0.2$.

In various embodiments, component (B) is an organic compound having at least two ether bonds and at least one acryloyl group or methacryloyl group in a molecule.

In various embodiments, a molar ratio of component ($C_1$) to component ($C_2$) in component (C) is in a range of from 0.45 to 2.8.

In various embodiments, component (D) is a photoradical initiator having a phosphorous atom.

In various embodiments, the photocurable silicone composition further comprises: (E) a hindered phenol compound, in an amount of from 0.001 to 1 part(s) by mass per 100 parts by mass of component (A).

In various embodiments, the photocurable silicone composition further comprises: (F) a radical scavenger other than component (E), in an amount of from 0.0001 to 1 part(s) by mass per 100 parts by mass of component (A).

In various embodiments, the photocurable silicone composition further comprises: (G) an adhesion-imparting agent, in an amount of 10 parts by mass or less per 100 parts by mass of component (A).

The cured product of the present invention is obtained by irradiating the photocurable silicone composition described above with light.

Effects of Invention

The photocurable silicone composition of the present invention cures by irradiation with an active energy ray to form a cured product that suppresses crack and delamination after thermal aging even when the photocurable silicone composition is laminated between two substrates and cured.

The cured product of the present invention exhibits excellent crack resistance and adhesion.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

<Photocurable Silicone Composition>

Component (A) is a base compound of the present composition and is an organopolysiloxane having at least one aryl group with 6 to 12 carbons and at least one alkenyl group with 2 to 12 carbons in a molecule.

Examples of the aryl groups include phenyl groups, tolyl groups, xylyl groups, and naphthyl groups. In various embodiments, from the perspective of economics, phenyl groups may be desirable.

Examples of the alkenyl groups include vinyl groups, allyl groups, isopropenyl groups, butenyl groups, pentenyl groups, hexenyl groups, heptenyl groups, cyclohexenyl groups, octenyl groups, nonenyl groups, decenyl groups, undecenyl groups, and dodecenyl groups. In various embodiments, from the perspective of economics and reactivity, vinyl groups, allyl groups, hexenyl groups, and octenyl groups may be desirable.

Examples of groups bonded to the silicon atom other than the aryl groups and alkenyl groups in component (A) include alkyl groups having 1 to 12 carbons such as methyl groups, ethyl groups, propyl groups, butyl groups, pentyl groups, hexyl groups, heptyl groups, and octyl groups; aralkyl groups having 7 to 20 carbons such as benzyl groups, phenethyl groups, and 3-phenylpropyl groups; halogenated alkyl groups having 1 to 12 carbons such as chloromethyl groups, 3-chloropropyl groups, 3,3,3-trifluoropropyl groups, and nonafluorobutylethyl groups. In various embodiments, from the perspective of economics, methyl groups may be desirable. Furthermore, the silicon atom in component (A) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like.

Component (A) is preferably an organopolysiloxane represented by the average composition formula:

$$R^1_a R^2_b SiO_{(4-a-b)/2}.$$

In the formula, $R^1$ is an alkenyl group having from 2 to 12 carbons, and examples thereof include vinyl group, allyl group, butenyl group, pentenyl group, hexenyl group, heptenyl group, octenyl group, nonenyl group, decenyl group, undecenyl group, and dodecenyl group. Among these, vinyl group and hexenyl group are preferred.

In the formula, $R^2$ is an alkyl group having from 1 to 12 carbons, an aryl group having from 6 to 12 carbons, or an aralkyl group having from 7 to 12 carbons. Examples of the alkyl group include methyl group, ethyl group, propyl group, isopropyl group, butyl group, pentyl group, hexyl group, heptyl group, octyl group, nonyl group, decyl group, undecyl group, and dodecyl group. Among these, methyl group is preferred. Examples of the aryl group include phenyl group, tolyl group, naphthyl group, and biphenyl group. Among these, phenyl group is preferred. Examples of the aralkyl group include phenylmethyl group, 1-phenylethyl group, 2-phenylethyl group, and 2-phenylpropyl group. Among these, 2-phenylethyl group and 2-phenylpropyl group are preferred. In component (A), at least 30 mol % of $R^2$ in a molecule are the aryl groups or the aralkyl groups.

Furthermore, in the formula, "a" and "b" are positive numbers satisfying: $1 \leq a+b \leq 2.5$, and preferably $1.5 \leq a+b \leq 2.2$, and satisfying: $0.001 \leq a/(a+b) \leq 0.2$, and preferably $0.005 \leq a/(a+b) \leq 0.1$.

The state of component (A) at 25° C. is not limited and is preferably a liquid. The viscosity at 25° C. of component (A) is not limited; however, the viscosity is preferably in a range of 100 to 1000000 mPa·s.

Component (A) may be one type of organopolysiloxane that satisfies the average composition formula above or may be a mixture of at least two types of organopolysiloxanes that satisfy the average composition formula above. Examples of such component (A) include organopolysiloxanes represented by the following "average composition formulas: average formulas". Note that, in the formulas, "Me", "Vi", "Hex", "Ph", "Phe", and "Php" respectively indicate methyl group, vinyl group, hexenyl group, phenyl group, 2-phenylethyl group, and 2-phenylpropyl group.

$Vi_{0.03}Me_{1.03}Ph_{0.97}SiO_{0.99}$:$ViMe_2SiO(MePhSiO)_{65}SiMe_2Vi$
$Vi_{0.10}Me_{1.10}Ph_{0.90}SiO_{0.95}$:$ViMe_2SiO(MePhSiO)_{18.4}SiMe_2Vi$
$Vi_{0.09}Me_{1.06}Ph_{0.91}SiO_{0.97}$:$PhSi\{O(PhMeSiO)_{10}SiMe_2Vi\}_3$
$Hex_{0.09}Me_{1.07}Ph_{0.89}SiO_{0.98}$:$Si\{O(PhMeSiO)_{10}SiMe_2Hex\}_4$
$Hex_{0.12}Me_{1.12}Ph_{0.88}SiO_{0.94}$:$HexMe_2SiO(PhMeSiO)_{15}SiMe_2Hex$
$Vi_{0.06}Me_{1.38}Phe_{0.63}Si_{0.97}$:$ViMe_2SiO(PheMeSiO)_{20}(Me_2SiO)_{10}SiMe_2Vi$
$Hex_{0.06}Me_{1.38}Php_{0.63}Si_{0.97}$:$HexMe_2SiO(PhpMeSiO)_{20}(Me_2SiO)_{10}SiMe_2Hex$

Component (B) is a second base compound of the present composition and is an organic compound having at least two ether bonds and at least one aliphatic carbon-carbon double bond in a molecule. The group having an aliphatic carbon-carbon double bond in component (B) is not limited, and examples thereof include an alkenyl group, an acryloyl group, and a methacryloyl group. Among these, an acryloyl group or a methacryloyl group is preferred. Furthermore, the state of component (B) at 25° C. is not limited and is preferably a liquid. The viscosity at 25° C. of component (B) is not limited; however, the viscosity is preferably in a range of 1 to 10000 mPa·s.

Examples of such component (B) include phenoxy diethylene glycol acrylate, phenoxy tetraethylene glycol acrylate, methoxy triethylene glycol acrylate, methoxy nonaethylene glycol acrylate, methoxy polyethylene glycol acrylate, ethoxy diethylene glycol acrylate, ethoxyethoxyethyl acrylate, nonylphenoxy tetraethylene glycol acrylate, nonylphenoxy octaethylene glycol acrylate, nonylphenoxy dipropylene glycol acrylate, methoxy diethylene glycol methacrylate, methoxy polyethylene glycol methacrylate, polyethylene glycol methacrylate, triethylene glycol diacrylate, polyethylene glycol diacrylate, dipropylene glycol diacrylate, tripropylene glycol diacrylate, polypropylene glycol diacrylate, bisphenol diethylene glycol diacrylate, bisphenol A triethylene glycol diacrylate, tetraethylene glycol diacrylate, bisphenol A polyethylene glycol diacrylate, diethylene glycol dimethacrylate, triethylene glycol dimethacrylate, polyethylene glycol dimethacrylate, polypropylene glycol dimethacrylate, bisphenol A diethylene glycol dimethacrylate, bisphenol A triethylene glycol dimethacrylate, bisphenol A tetraethylene glycol dimethacrylate, bisphenol A polyethylene glycol dimethacrylate, triethylene glycol divinyl ether, tripropylene glycol divinyl ether, polyethylene glycol monoallyl ether, methoxy polyethylene glycol allyl ether, propylene glycol allyl ether, butoxy polyethylene glycol/propylene glycol allyl ether, polyethylene glycol diallyl ether, polypropylene glycol diallyl ether, trimethylolpropane triallyl ether, trimethylolpropane diallyl ether, pentaerythritol tetraallyl ether, and pentaerythritol triallyl ether.

The content of component (B) is in a range of 1 to 50 part(s) by mass, optionally in a range of from 5 to 40 parts by mass, optionally in a range of from 5 to 40 parts by mass, or optionally in a range of from 10 to 40 parts by mass, per 100 parts by mass of component (A). This is because, when the content of component (B) is greater than or equal to the lower limit of the range described above, reduction in transmittance of the cured product at a high temperature/high humidity becomes small. On the other hand, when the content is less than or equal to the upper limit of the range described above, change in hardness of the cured product at a high temperature is made small and coloring is reduced.

Component (C) is a curing agent of the present composition and is a thiol group-containing organic compound comprising: $(C_1)$ an organic compound having two thiol groups in a molecule; and $(C_2)$ an organic compound having at least three thiol groups in a molecule.

Component $(C_1)$ is an organic compound having two thiol groups in a molecule. Component $(C_1)$ is not limited as long as the organic compound has sufficient solubility in component (A) and/or component (B). Examples of such component $(C_1)$ include o-, m-, or p-xylenedithiol, ethyleneglycol bisthioglycolate, butanediol bisthioglycolate, hexanediol bisthioglycolate, ethyleneglycol bis(3-thiopropionate), butanediol bis(3-thiopropionate), and organopolysiloxanes substituted with a mercapto group.

Component $(C_2)$ is an organic compound having at least three thiol groups in a molecule. Component $(C_2)$ is not limited as long as the organic compound has sufficient solubility in component (A) and/or component (B). Examples of such component $(C_2)$ include trimethylolpropane tris(3-thiopropionate), pentaerythritol tetrakis(3-thiopropionate), trihydroxyethyl triisocyanuric acid tris(3-thiopropionate), and organopolysiloxanes substituted with a mercapto group.

A molar ratio of component $(C_1)$ to component $(C_2)$ in component (C) is preferably in a range of from 0.45 to 2.8, optionally in a range of from 0.5 to 2.8, optionally in a range of from 0.6 to 2.8, optionally in a range of from 0.5 to 2.6, optionally in a range of from 0.5 to 2.5, or optionally in a range of from 0.6 to 2.4. This is because, when the molar ratio of component $(C_1)$ to component $(C_2)$ in component (C) is greater than or equal to the lower limit of the range described above, reduction in transmittance of the cured product at a high temperature/high humidity becomes small. On the other hand, when the molar ratio of component $(C_1)$ to component $(C_2)$ in component (C) is less than or equal to the upper limit of the range described above, change in hardness of the cured product at a high temperature is made small and coloring is reduced.

Examples of such component (C) include o-, m-, or p-xylenedithiol, ethyleneglycol bisthioglycolate, butanediol bisthioglycolate, hexanediol bisthioglycolate, ethyleneglycol bis(3-thiopropionate), butanediol bis(3-thiopropionate), trimethylolpropane tris(3-thiopropionate), pentaerythritol tetrakis(3-thiopropionate), trihydroxyethyl triisocyanuric acid tris(3-thiopropionate), and organopolysiloxanes substituted with a mercapto group.

The content of component (C) is in a range of from 4 to 40 parts by mass, optionally in a range of from 5 to 30 parts by mass, or optionally in a range of from 5 to 20 parts by mass, per 100 parts by mass of component (A). While the content of component (C) is an amount that the amount of the thiol groups provided by the present component is in a range of from 0.2 to 2.0 moles, optionally in a range of from 0.3 to 1.6 moles, or optionally in a range of from 0.5 to 1.5 moles, per 1 mole of the total aliphatic carbon-carbon double bonds in components (A) and (B) of the present composition. This is because, when the content of component (C) is within the range described above, mechanical strength of the resulting cured product increases.

Component (D) is a component to initiate photocuring reaction of the present composition. Component (D) is not limited, however, it is preferably a photoradical initiator containing a phosphorus atom. Examples of such component (D) include diphenyl(2,4,6-trimethylbenzoyl)phosphine oxide (trade name: TPO, manufactured by BASF), ethyl(2, 4,6-trimethylbenzoyl)phenyl phosphonate (trade name: TPO-L, manufactured by BASF), and phenylbis(2,4,6-trimethylbenzoyl)phosphine oxide (trade name: IRGACURE 819, manufactured by BASF).

The content of component (D) is in a range of from 0.05 to 2 parts by mass, optionally in a range of from 0.05 to 1 part(s) by mass, or optionally in a range of from 0.1 to 0.8 parts by mass, per 100 parts by mass of component (A). This is because, when the content of component (D) is within the range described above, curing efficiently proceeds to form a cured product having excellent heat resistance and light resistance.

The present composition comprises component (A) to component (D) described above; however, to enhance heat resistance of a cured product of the present composition, (E) a hindered phenol compound is preferably contained. Examples of such component (E) include pentaerythritol tetrakis[3-(3,5-di-tert-butyl-4-hydroxyphenyl)propionate], thiodiethylene bis[3-(3,5-di-tert-butyl-4-hydroxyphenyl) propionate], octadecyl-3-(3,5-di-tert-butyl-4-hydroxyphenyl)propionate, 2,4-dimethyl-6-(1-methylpentadecyl)phenol, diethyl[{3,5-bis(1,1-di-tert-butyl-4-hydroxyphenyl)methyl}phosphonate, 3 3',3'',5,5',5''-hexane-tert-butyl-4-a, a',a''-(mesitylene-2,4,6-tolyl)tri-p-cresol, 4,6-bis (octylthiomethyl)-o-cresol, ethylenebis(oxyethylene)bis[3-(5-tert-butyl-4-hydroxy-m-tolyl)propionate], and hexamethylene bis[3-(3,5-di-tert-butyl-4-hydroxyphenyl)propionate].

The content of component (E) is not limited, however, the content is preferably in a range of from 0.001 to 1 part(s) by mass, or optionally in a range of 0.003 to 0.5 parts by mass, per 100 parts by mass of component (A). This is because, when the content of component (E) is within the range described above, change in viscosity of the composition prior to the photocuring is small and a cured product having excellent heat resistance and light resistance is obtained.

The present composition comprises component (A) to component (E) described above; however, to enhance storage stability in a light-shielded condition of the present composition, (F) a radical scavenger other than component (E) is preferably contained. Examples of such component (F) include hindered amines, such as N,N',N'',N'''-tetrakis (4,6-bis(butyl-(N-methyl-2,2,6,6-tetramethylpiperidin-4-yl) amino)-triazin-2-yl)-4,7-diazadecane-1,10-diamine, bis(1,2, 2,6,6-pentamethyl-4-piperidyl)[[3,5-bis(1,1-dimethylethyl)-4-hydroxyphenyl]methyl]butylmalonate, methyl-1,2,2,6,6-pentamethyl-4-piperidylsebacate, bis(2,2,6,6-tetramethyl-4-piperidyl)sebacate, bis(1,2,2,6,6-pentamethyl-4-piperidyl) sebacate, and 8-acetyl-3-dodecyl-7,7,9,9-tetramethyl-1,3,8-triazaspiro[4.5]decane-2,4-dione; quinones or phenols, such as methylhydroquinone, 1,4-naphthoquinone, 4-methoxynaphthol, tert-butylhydroquinone, benzoquinone, pyrogallol, and phenothiazine.

The content of component (F) is not limited; however, the content is preferably in a range of from 0.0001 to 1 part(s) by mass, optionally in a range of from 0.0001 to 0.1 parts by mass, or optionally in a range of from 0.0001 to 0.05 parts by mass, per 100 parts by mass of component (A). This is because, when the content of component (F) is within the range described above, a cured product having excellent heat resistance and light resistance is obtained.

The present composition may further contain, as an optional component, (G) an adhesion-imparting agent, as long as the object of the present invention is not impaired.

Examples of component (G) include silane compounds, such as 3-glycidoxypropyltrimethoxysilane, 2-(3,4-epoxycyclohexyl)ethyltrimethoxysilane, and 3-methacryloxy propyltrimethoxysilane; siloxane compounds having at least one of silicon atom-bonded alkenyl groups and/or silicon atom-bonded hydrogen atoms, and at least one silicon atom-bonded alkoxy group in a molecule; mixtures of a silane compound or siloxane compound having at least one silicon atom-bonded alkoxy group and a siloxane compound having at least one silicon atom-bonded hydroxy group and at least one silicon atom-bonded alkenyl group in a molecule; methyl polysilicate, ethyl polysilicate, and epoxy group-containing ethyl polysilicate. The content of the adhesion-imparting agent is not limited; however, the content is preferably in a range of 0.01 to 10 parts by mass per 100 parts by mass of component (A).

The present composition may further contain, as an optional component, (H) an UV absorber other than component (D) described above, as long as the object of the present invention is not impaired.

Examples of such component (H) include substituted and unsubstituted benzophenones, benzotriazoles, cyanoacrylates, and hydroxyphenyltriazines. For example, suitable UV absorbers include a variety of hydroxybenzophenones, hydroxyphenyltriazines (HPT), and hydroxybenzotriazoles. Preferred UV absorbers include commercially available compounds under the trade name TINUVIN® by BASF Corporation of Florham Park, New Jersey, including TINUVIN® 384-2 (a liquid hydroxybenzotriazole UV light absorbing compound), TINUVIN® 479 (a hydroxyphenyltriazine UV light absorbing compound) and TINUVIN® 400 (a liquid hydroxyphenyltriazine (HPT) UV light absorbing compound). Other suitable UV absorbers that may be utilized are disclosed, for example, in U.S. Patent Application No. 2006/0007519 A1, the disclosure of which is hereby incorporated by reference.

The content of component (H) is not limited; however, the content is preferably 2 parts by mass or less, or optionally 1 part by mass or less, per 100 parts by mass of component (A).

The present composition may further contain, as an optional component, an organic compound having at least one aliphatic carbon-carbon double bond in a molecule other than components (A) and (B) described above; an inorganic filler, such as silica, titanium oxide, glass, alumina, or zinc oxide; an organic resin fine powder of polymethacrylate resin, silicone resin, or the like; as well as a pigment or a fluorescent substance, as long as the object of the present invention is not impaired.

Examples of such the organic compound include methyl acrylate, methyl methacrylate, butyl acrylate, butyl methacrylate, isobornyl acrylate, isobornyl methacrylate, isooctyl acrylate, lauryl acrylate, stearyl acrylate, isodecyl acrylate, triacrylate, hydroxyethyl acrylate, hydroxyethyl methacrylate, methoxyethyl acrylate, methoxyethyl methacrylate, phenoxyethyl acrylate, tetrahydrofuran acrylate, benzyl acrylate, o-phenylphenol ethoxyethyl acrylate, 2-ethylhexyl acrylate, hexane diol diacrylate, nonane diol diacrylate, 2-propenoic acid octahydro-4,7-methano-1H-inden-5-yl ester, decyl vinyl ether, 2-ethylhexyl vinyl ether, 1-octene, 1-decene, 1-dodecene, 1-tetradecene, 1-hexadecene, allyl methacrylate, divinyl sulfone, 3-methacryloxypropyltrimethoxysilane, and 3-acryloxypropyltrimethoxysilane.

The viscosity at 25° C. of the present composition is not limited; however, the viscosity is preferably in a range of 100 to 100000 mPa·s, or optionally in a range of 500 to 10000 mPa·s. This is because, when the viscosity of the present composition is greater than or equal to the lower limit of the range described above, a cured product having high mechanical strength can be obtained. On the other hand, when the viscosity is less than or equal to the upper limit of the range described above, excellent coatability/workability of the resulting composition is achieved and formation of a void in the cured product is avoided.

The present composition is useful as various potting agents, sealing agents, and adhesive agents. Since the cured product thereof causes less coloring at a high temperature or in a high temperature/high humidity condition and is less likely to cause haze, the present composition is suitable as a material to form a middle layer in between an image display part and a protective part of the image display device.

<Cured Product>

The cured product of the present invention is obtained by irradiating the photocurable silicone composition described above with light. Examples of the light used to cure the present composition include ultraviolet light and visible light; however, the light with a wavelength in a range of 250 to 500 nm is preferred. This is because excellent curability is achieved, and the cured product is not decomposed by the light.

The cured product is typically optically transparent. This is because when the cured product is preferably used for an optical device or an image display, optical transparency is desirable for high performance. The form of the cured product is not limited and may be in a sheet, film, or block form. The cured product may be combined with various substrates. The cured product is typically laminated between same or different substrates, and especially, between same or different substrates in an optical device.

The state of the cured product is not limited, but it is preferably an elastomer or gel. Hardness of the cured product is preferably in a range of 0 to 80, or optionally in a range of 10 to 70, in Shore OO Hardness. While, penetration of the cured product is preferably in a range of 0 to 100, or optionally in a range of 10 to 70. This is because when the cure product is within the range described above, good cohesive strength against deformation and good flexibility against material fracture are obtained. Note that in the present specification, Shore OO Hardness is the value measured using a type OO hardness according to ASTM D 2240 at 23±2° C. While, penetration is the value measured using a needle penetration stipulated with ¼ cone accordance with JIS K 2220.

The cured product is useful as laminates in an optical device or an image display. The optical device is, for example, an optical semiconductor device. Examples of the optical semiconductor device include a light emitting diode (LED), a photocoupler, and a CCD. Moreover, a light emitting diode (LED) element and a solid-state image sensor are illustrated as an optical semiconductor element. In particular, even in the case of collectively sealing a so-called micro LED (mini LED) having a structure in which a large number of small LED elements are disposed on a substrate, the photocurable silicone composition of the present invention can be suitably used. At this time, the refractive index of the cured product may be adjusted as desired by selecting the type of functional group such as the content of aryl group. Furthermore, since the photocurable silicone composition of the present invention is excellent in heat resistance and moisture resistance, it is hard to cause a decrease in transparency and hardly causes turbidity. Therefore, there is an advantage that the light extraction efficiency of the optical semiconductor device including the Micro LED can be maintained well.

EXAMPLES

The photocurable silicone composition and the cured product thereof of the present invention will now be described in detail using Practical Examples and Comparative Examples. Note that, in the formulas, "Me", "Ph", and "Vi" respectively indicates methyl group, phenyl group, and vinyl group. The characteristics of the cured product of the photocurable silicone composition were measured as follows.

<Appearance of Cured Product>

The photocurable silicone composition was filled into a mold having a concavity with a predetermined shape and was irradiated from the liquid surface at the top with ultraviolet light using a 405 nm UV-LED lamp in a manner that the cumulative radiation was 4000 mJ/cm$^2$. Appearance of the cured product was observed by visual inspection.

<Penetration of Cured Product>

The photocurable silicone composition was filled into a mold having a concavity with a predetermined shape and was irradiated from the liquid surface at the top with ultraviolet light using a 405 nm UV-LED lamp in a manner that the cumulative radiation was 4000 mJ/cm$^2$. The penetration of the cured product was measured using a needle penetration stipulated with ¼ cone accordance with JIS K 2220.

<Lap Shear Elongation and Strength of Cured Product>

The photocurable silicone composition was poured between two glass substrates with size of 25 mm length×75 mm width×2 mm thickness to make adhesion area of 25 mm length×25 mm width×0.2 mm thickness and was irradiated from the glass surface at the top with ultraviolet light using a 405 nm UV-LED lamp in a manner that the cumulative radiation was 4000 mJ/cm$^2$. Lap shear strength of the cured product was measured in accordance with JIS K 6850. At the same time, lap shear elongation was expressed in percent of thickness of the cured product to deformation amount at break point.

<Appearance of Laminated Panel after Thermal Aging Test>

The photocurable silicone composition was filled between a glass substrate with size of 165 mm length×105 mm width×2 mm thickness and a PMMA-coated PC substrate with size of 210 mm length×160 mm width×1 mm thickness to make the cured product of 165 mm length×85 mm width×0.13 mm thickness. The laminate was irradiated from the glass surface at the top with ultraviolet light using a 405 nm UV-LED lamp in a manner that the cumulative radiation was 4000 mJ/cm$^2$. The cured laminate was subjected to thermal aging at 90° C. for 24 hours and its appearance was checked visually.

Practical Examples 1 to 5 and Comparative Examples 1 to 8

The following components were uniformly mixed according to the compositions (parts by mass) shown in Tables 1 to 5 to prepare the photocurable silicone compositions of Practical Examples 1 to 5 and Comparative Examples 1 to 8. In the formulae, "Me", "Vi", "Ph", and "Ep" represent a methyl group, vinyl group, phenyl group, and a 3-glycidoxypropyl group, respectively. In Table 1, "(c1)/(c2)" represents the moles of component (c1) per 1 mole of component (c2) in the photocurable silicone compositions. Moreover, in Table 1, "SH/C=C" represents the moles of thiol groups in component (C) per 1 mole of aliphatic saturated carbon-carbon double bonds in components (A) and (B) in the photocurable silicone compositions. The characteristics of the photocurable silicone composition and the cured product thereof are shown in Table 1.

The following organopolysiloxanes were used as component (A).

(a1) an organopolysiloxane that had a viscosity of 2000 mPa·s and that was represented by the average formula:

$$ViMe_2SiO(MePhSiO)_{18.4}SiMe_2Vi$$

(the average composition formula: $Vi_{0.10}Me_{1.10}Ph_{0.90}SiO_{0.95}$)

(a2) an organopolysiloxane that had a viscosity of 40000 mPa·s and that was represented by the average formula:

$$ViMe_2SiO(MePhSiO)_{65}SiMe_2Vi$$

(the average composition formula: $Vi_{0.03}Me_{1.03}Ph_{0.97}SiO_{0.99}$)

The following organic compounds were used as component (B).

(b1): nonylphenoxy octaethylene glycol acrylate having a viscosity of 150 mPa·s (b2): tridecaethylene glycol diacrylate having a viscosity of 100 mPa·s The following compounds were used as component (C).

(c1): 1,4-bis(3-thiobutyryloxy)butane (c2): pentaerythritol tetrakis(3-thiobutylate)

The following photoradical initiator was used as component (D).

(d1): diphenyl(2,4,6-trimethylbenzoyl)phosphine oxide

The following hindered phenol compound was used as component (E).

(e1): 2,6-di-tert-butyl-p-cresol

The following radical scavenger was used as component (F).

(f1): aluminum-N-nitroso-N-phenylhydroxylamine

The following organopolysiloxane was used as component (G).

(g1): an organopolysiloxane represented by the following average unit formula:

$$(Me_2ViSiO_{1/2})_{0.18}(MeEpSiO_{2/2})_{0.28}(PhSiO_{3/2})_{0.54}$$

The following organic compound was used as component (H).

(h1): TINUVIN 384-2, a liquid UV absorber of the hydroxyphenylbenzotriazole class, produced by BASF

TABLE 1

| | | | Practical Examples | | | | |
|---|---|---|---|---|---|---|---|
| | | | 1 | 2 | 3 | 4 | 5 |
| Composition of photocurable silicone composition (part by mass) | (A) | (a1) | 57.3 | 57.3 | 57.3 | 57.3 | 57.3 |
| | | (a2) | 42.7 | 42.7 | 42.7 | 42.7 | 42.7 |
| | (B) | (b1) | 19.5 | 19.9 | 18.6 | 18.6 | 18.4 |
| | | (b2) | — | — | 1.3 | 1.3 | 1.3 |
| | (C) | (c1) | 1.8 | 4.8 | 4.9 | 5.3 | 4.3 |
| | | (c2) | 5.0 | 4.4 | 4.5 | 4.4 | 4.0 |
| | (D) | (d1) | 0.26 | 0.27 | 0.27 | 0.13 | 0.26 |
| | (E) | (e1) | 0.04 | 0.04 | 0.04 | 0.02 | 0.04 |
| | (F) | (f1) | 0.003 | 0.003 | 0.003 | 0.002 | 0.003 |
| | (G) | (g1) | 3.2 | 3.3 | 3.3 | 3.4 | 3.3 |
| | (H) | (h1) | — | — | 0.7 | — | — |
| (c1)/(c2) | | | 0.7 | 2.0 | 2.0 | 2.2 | 2.0 |
| SH/C = C | | | 0.7 | 0.9 | 0.9 | 0.9 | 0.8 |
| Characteristics of the cured product | Appearance | | TP | TP | TP | TP | TP |
| | Penetration | | 42 | 51 | 31 | 52 | 49 |
| | Lap shear elongation (%) | | 1026 | 1338 | 1083 | 1535 | 1072 |
| | Lap shear strength (MPa) | | 0.32 | 0.35 | 0.51 | 0.48 | 0.61 |
| Appearance of laminated panel after thermal aging test | | | No failure | No failure | No failure | No failure | No failure |

| | | | Comparative Examples | | | | |
|---|---|---|---|---|---|---|---|
| | | | 1 | 2 | 3 | 4 | 5 |
| Composition of photocurable silicone composition (part by mass) | (A) | (a1) | 57.3 | 57.3 | 57.3 | 57.3 | 57.3 |
| | | (a2) | 42.7 | 42.7 | 42.7 | 42.7 | 42.7 |
| | (B) | (b1) | 19.5 | 19.5 | 20.2 | 19.5 | 20.1 |
| | | (b2) | — | — | — | — | — |
| | (C) | (c1) | — | 4.7 | 7.1 | 0.7 | 1.1 |
| | | (c2) | 6.8 | 2.3 | 3.6 | 6.2 | 9.2 |
| | (D) | (d1) | 0.26 | 0.26 | 0.27 | 0.26 | 0.27 |
| | (E) | (e1) | 0.04 | 0.04 | 0.04 | 0.04 | 0.04 |
| | (F) | (f1) | 0.003 | 0.003 | 0.003 | 0.002 | 0.003 |
| | (G) | (g1) | 3.3 | 3.3 | 3.4 | 3.3 | 3.4 |
| | (H) | (h1) | — | — | — | — | — |
| (c1)/(c2) | | | 0 | 3.7 | 3.7 | 0.2 | 0.2 |
| SH/C = C | | | 0.7 | 0.7 | 1.0 | 0.7 | 1.0 |
| Characteristics of the cured product | Appearance | | TP | Not measured by uncured | Not measured by uncured | TP | TP |
| | Penetration | | 20 | | | 22 | 22 |
| | Lap shear elongation (%) | | 619 | | | 1155 | 740 |
| | Lap shear strength (MPa) | | 0.35 | | | 0.72 | 0.54 |
| Appearance of laminated panel after thermal aging test | | | Crack | | | Crack and Delami- | Delami- nation |

TABLE 1-continued

| | | | Combination Comparative Examples | | |
|---|---|---|---|---|---|
| | | | 6 | 7 | 8 |
| Composition of photocurable silicone composition (part by mass) | (A) | (a1) | 57.3 | 57.3 | 57.3 |
| | | (a2) | 42.7 | 42.7 | 42.7 |
| | (B) | (b1) | 12.1 | 18.4 | 22.6 |
| | | (b2) | 8.1 | — | — |
| | (C) | (c1) | 5.4 | 0.5 | 12.3 |
| | | (c2) | 5.0 | 0.5 | 11.4 |
| | (D) | (d1) | 0.27 | 0.25 | 0.30 |
| | (E) | (e1) | 0.04 | 0.04 | 0.05 |
| | (F) | (f1) | 0.003 | 0.003 | 0.004 |
| | (G) | (g1) | 3.4 | 3.1 | 3.8 |
| | (H) | (h1) | — | — | — |
| (c1)/(c2) | | | 2.0 | 2.0 | 2.0 |
| SH/C = C | | | 0.9 | 0.1 | 2.2 |
| Characteristics of the cured product | Appearance | | Hazy | Not measured | Not measured |
| | Penetration | | 10 | | |
| | Lap shear elongation (%) | | — | by uncured | by uncured |
| | Lap shear strength (MPa) | | — | | |
| Appearance of laminated panel after thermal aging test | | | — | | |

* where "TP" is "Transparent".

INDUSTRIAL APPLICABILITY

The present composition is cured easily by irradiation with a high energy ray, such as ultraviolet light and visible light, provides transparent cured products, and suppresses crack and delamination of a cured product in an optical device or an image display. Therefore, the present composition is useful as various potting agents, sealing agents, and adhesive agents.

What is claimed is:

1. A photocurable silicone composition comprising:
   (A) 100 parts by mass of an organopolysiloxane having at least one aryl group with 6 to 12 carbons and at least one alkenyl group with 2 to 12 carbons in a molecule;
   (B) from 1 to 50 part(s) by mass of an organic compound having at least two ether bonds and at least one aliphatic carbon-carbon double bond in a molecule;
   (C) from 4 to 40 parts by mass of a thiol group-containing organic compound comprising;
      ($C_1$) an organic compound having two thiol groups in a molecule, and
      ($C_2$) an organic compound having at least three thiol groups in a molecule; and
   (D) from 0.05 to 2 parts by mass of a photoradical initiator;
      wherein a molar ratio of component ($C_1$) to component ($C_2$) in component (C) is in a range of from 0.45 to 2.8.

2. The photocurable silicone composition according to claim 1, wherein component (A) is an organopolysiloxane represented by the average composition formula:

$$R^1_a R^2_b SiO_{(4-a-b)/2}$$

wherein, $R^1$ is an alkenyl group having from 2 to 12 carbons, $R^2$ is an alkyl group having from 1 to 12 carbons, an aryl group having from 6 to 12 carbons, or an aralkyl group having from 7 to 12 carbons; provided that, at least 30 mol % of $R^2$ are the aryl groups or the aralkyl groups; and "a" and "b" are positive numbers satisfying: $1 \leq a+b \leq 2.5$ and $0.001 \leq a/(a+b) \leq 0.2$.

3. The photocurable silicone composition according to claim 1, wherein component (B) is an organic compound having at least two ether bonds and at least one acryloyl group or methacryloyl group in a molecule.

4. The photocurable silicone composition according to claim 1, wherein component (C) is present in an amount of from 4 to 9.7 parts by mass.

5. The photocurable silicone composition according to claim 1, wherein component (D) is a photoradical initiator having a phosphorus atom.

6. The photocurable silicone composition according to claim 1, further comprising:
   (E) a hindered phenol compound, in an amount of from 0.001 to 1 part(s) by mass per 100 parts by mass of component (A).

7. The photocurable silicone composition according to claim 1, further comprising:
   (F) a radical scavenger other than component (E), in an amount of from 0.0001 to 1 part(s) by mass per 100 parts by mass of component (A).

8. The photocurable silicone composition according to claim 1, further comprising:
   (G) an adhesion-imparting agent, in an amount of 10 parts by mass or less per 100 parts by mass of component (A).

9. A cured product obtained by irradiating the photocurable silicone composition according to claim 1 with light.

10. The photocurable silicone composition according to claim 6, further comprising:
    (F) a radical scavenger other than component (E), in an amount of from 0.0001 to 1 part(s) by mass per 100 parts by mass of component (A).

11. The photocurable silicone composition according to claim 10, further comprising:
    (G) an adhesion-imparting agent, in an amount of 10 parts by mass or less per 100 parts by mass of component (A).

12. The photocurable silicone composition according to claim 6, further comprising:
(G) an adhesion-imparting agent, in an amount of 10 parts by mass or less per 100 parts by mass of component (A).

13. The photocurable silicone composition according to claim 1, wherein a molar ratio of thiol groups in component (C) per 1 mole of aliphatic saturated carbon-carbon double bonds in components (A) and (B) ranges from 0.7 to 0.9.

* * * * *